United States Patent [19]

Nelson et al.

[11] Patent Number: 4,477,213
[45] Date of Patent: Oct. 16, 1984

[54] CHUCK KEY HOLDER FOR A POWER TOOL

[75] Inventors: James W. Nelson, Union Grove; Steven R. Wente, Kenosha, both of Wis.

[73] Assignee: Snap-on Tools Corporation, Kenosha, Wis.

[21] Appl. No.: 530,614

[22] Filed: Sep. 9, 1983

Related U.S. Application Data

[63] Continuation of Ser. No. 254,919, Apr. 16, 1981, abandoned.

[51] Int. Cl.$^3$ .............................................. B23B 45/00
[52] U.S. Cl. ................................ 408/241 R; 81/90 A; 279/1 K; 279/1 Q
[58] Field of Search ............... 408/241 R, 210, 240, 408/16; 279/1 K, 1 Q; 81/90 A, 180 R; 403/219, 220, 223; 269/287, 254 R, 16; 30/297, 298; 220/85 D, 85 R; 206/228, 230, 349; 24/127, 130, 129 D, 155 SD

[56] References Cited

U.S. PATENT DOCUMENTS

| 2,257,559 | 11/1941 | Albertson | 408/241 |
| 3,664,754 | 5/1972 | Kelbel | 408/16 |
| 3,945,089 | 3/1976 | Gagnon | 24/155 SD |
| 4,032,160 | 6/1977 | Karasa et al. | 279/1 K |

Primary Examiner—Frank T. Yost
Assistant Examiner—Hien H. Phan
Attorney, Agent, or Firm—Emrich & Dithmar

[57] ABSTRACT

A chuck key holder for a power tool, such as an electric or pneumatic drill or the like, comprises an elastic member mounted on a part of the power tool such as the handle. The elastic member has an aperture therein adapted to receive a part of the chuck key, the aperture being of such size as securely to retain the chuck key frictionally, and to permit ready removable thereof for use, and easy replacement following use. The end of the aperture into which the chuck key part enters advantageously is defined by a chamfered surface which serves to facilitate entry of the inserted part. The holder is permanent in nature, enables the user to return the chuck key to a definite place following each use, thereby assuring that the key will be available conveniently for the next use.

3 Claims, 7 Drawing Figures

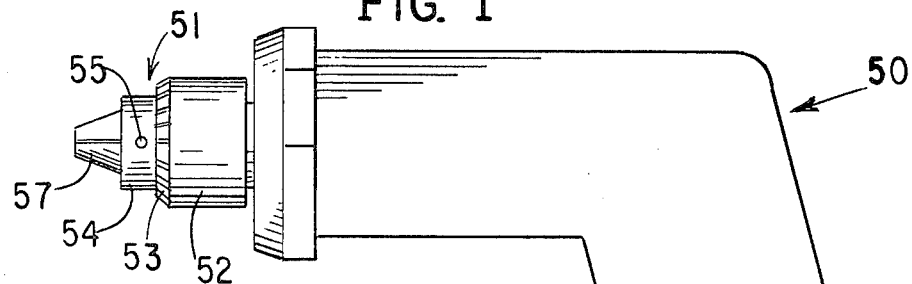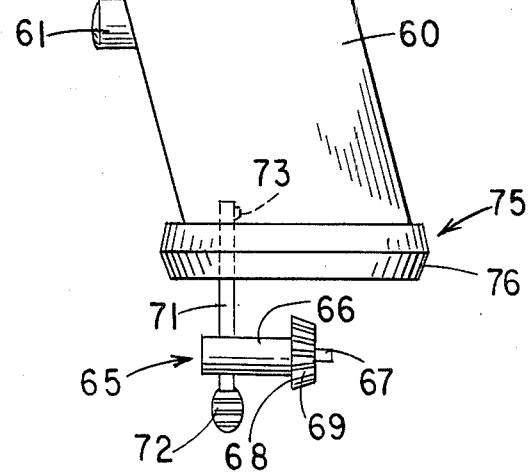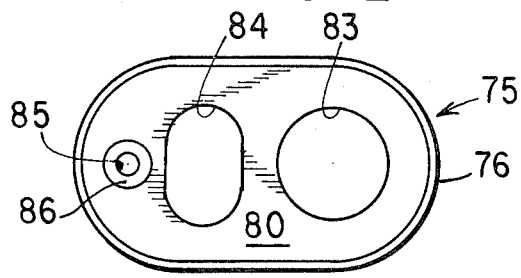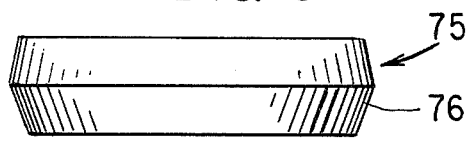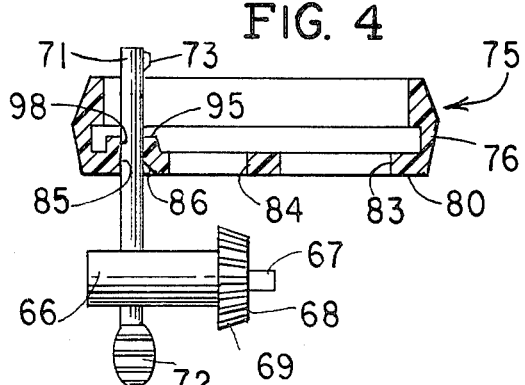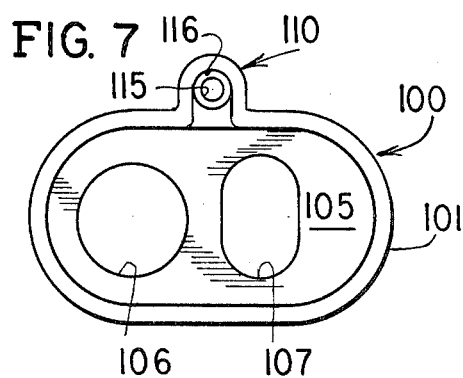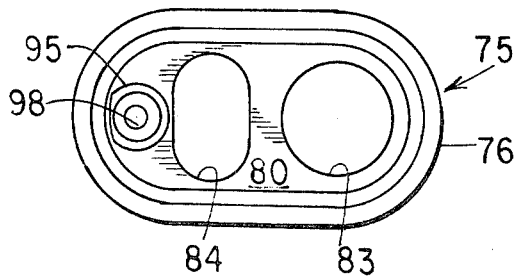

CHUCK KEY HOLDER FOR A POWER TOOL

This is a continuation of application Ser. No. 254,919, filed Apr. 16, 1981, now abandoned.

This invention relates to a chuck key holder for a power tool, and more particularly to a device for holding a chuck key in a fixed, convenient relation with an associated power tool.

Many power tools, such as drills and the like, utilize a chuck key to change drill bits, and it is a problem to avoid misplacement or loss of the chuck key when not in use.

One arrangement for holding a chuck key in desired relation with a power tool employs a cord of convenient length which connects the chuck key with an associated electrical conductor or pneumatic hose adjacent the tool. This has drawbacks, one of which is that the cord tends to slide away from the tool, and when the operator desires to use the key, he often finds it no longer is conveniently adjacent the tool. Also, such a cord is subject to breakage, or unintentional disconnection.

The cord arrangement is particularly disadvantageous with pneumatic power tools because of the excessive vibration of such tools, and the consequent danger of a metal chuck key at the end of even a short cord.

SUMMARY OF THE INVENTION

The invention contemplates a chuck key holder for a power tool having a handle, the holder comprising an elastic sleeve mounted snugly on the free end of the power tool handle. A portion of the elastic sleeve has an aperture therein which is adapted to receive a part of the chuck key without orientation thereof, the aperture having a size for frictionally retaining the part, while permitting ready manual removal of the chuck key for use, and subsequent convenient replacement.

The end of the aperture into which the chuck key part enters advantageously is defined by a chamfered surface to facilitate entry of the part.

Two forms of the invention are illustrated and described herein. In one form, the associated power tool handle is hollow, and the elastic sleeve mounted thereon has an integral elastic end wall at the free end thereof. The aperture which receives the chuck key part extends through the end wall, and the inserted key part projects into the hollow handle of the power tool. In this form, the end wall advantageously has an interior boss, the aperture also extending through the boss, whereby the retaining characteristic of the chuck key holder is enhanced.

In the other form of the invention illustrated and described herein, the elastic sleeve mounted on the power tool handle has an integral lateral enlargement, the aforesaid aperture extending through the lateral enlargement, whereby the received chuck key part is disposed alongside the exterior of the handle, and whereby the holder may be oriented on the handle to position the chuck key to accommodate either right or left-hand users.

Other features and advantages of the invention will be apparent as the description proceeds, reference being had to the accompanying drawings wherein two forms of the invention are shown. It is to be understood that the description and and drawings are illustrative only, and that the scope of the invention is to be measured by the appended claims.

BRIEF DESCRIPTION OF THE DRAWINGS

FIG. 1 is a side elevational view of a power tool having a chuck key holder embodying the invention and a chuck key associated therewith;

FIG. 2 is an enlarged bottom view of the chuck key holder shown in FIG. 1;

FIG. 3 is a side elevational view of the chuck key holder of FIG. 2;

FIG. 4 is a sectional view of the chuck key holder showing a chuck key associated therewith;

FIG. 5 is a top plan view of the chuck key holder of FIGS. 1-4;

FIG. 6 is a side elevational view of a modified form of the chuck key holder showing a chuck key associated therewith; and FIG. 7 is a bottom view of the chuck key holder of FIG. 6.

DETAILED DESCRIPTION

Referring now to the drawings, there is disclosed in FIG. 1 a power tool 50 such as a drill which may be pneumatically or electrically powered. Power tool 50 has a usual chuck 51 operatively connected to the output shaft of a motor (not shown), the chuck having a ring 52 provided with a beveled gear 53 at one end. The ring 52 surrounds a collar 54 having an aperture 55, the ring and collar being associated with a plurality of movable jaws 57 in the usual fashion to interchangeably accommodate drill bits (not shown) in the jaws. The power tool 50 is provided with a handle 60, at least a portion of which is hollow, as well as an actuating mechanism or trigger 61.

A conventional chuck key 65 used to tighten or loosen jaws 57 includes a spindle 66 having an outwardly extending shaft 67 dimensioned to fit within the aperture 55 of collar 54 and a beveled gear 68 with the usual teeth 69 extending therefrom dimensioned to mesh with the beveled gear 53 on ring 52. Chuck key 65 further includes an elonagated handle part 71 having a flat portion 72 at one end thereof to facilitate manual manipulation and a protuberance 73 at the other end.

A chuck key holder embodying the invention, generally designated 75 in FIGS. 1-5, comprises an elastic sleeve 76 mounted snugly on the free end of power tool handle 60. In this form of the invention, sleeve 76 is substantially closed at the free end thereof by an elastic end wall 80 which has an aperture 83 for an electrical conductor or pneumatic hose (not shown), and an aperture 84 for exhaust air in the case of a pneumatic motor.

End wall 80 of sleeve 76 also has an aperture 85 therein which, as shown, is adapted to receive without orientation part 71 and protuberance 73 of the chuck key 65 used with tool 50. Aperture 85 is of the proper size for frictionally and removably retaining part 71 of chuck key 65, the part 71 extending into the hollow handle 60 as shown in FIG. 1. Referring to FIGS. 2 and 4, the end of aperture 85 into which chuck key part 71 enters is defined by a chamfered surface 86 which serves to facilitate entry of chuck key part 71.

Still referring to FIG. 4, and also to FIG. 5, end wall 80 has an interior boss 95 so positioned that an aperture 98 therethrough is aligned with aperture 85 in end wall 80. The lengthened aperture 84, 98 serves to enhance the retaining characteristic of the chuck key holder.

Referring now to FIGS. 6 and 7, a modified form of chuck key holder embodying the invention is generally designated 100. This form of holder comprises an elastic sleeve 101 which, as shown, has an end wall 105 containing an aperture 106 for a power cord or pneumatic hose (not shown), and an aperture 107 for exhaust air in the case of a pneumatic motor.

Elastic sleeve 101 has an integral lateral enlargement 110, best shown in FIG. 7. Enlargement 110 has an aperture 115 therethrough, the aperture being of proper size to receive and retain part 71 of chuck key 65 in frictional and removable manner, as described in connection with aperture 86,98 in the FIGS. 1–5 form of the invention.

As shown in FIG. 7, the entry end of aperture 115 is defined by a chamfered surface 116 which serves to facilitate entry of chuck key part 71, the same as before. In this form of the invention, the inserted chuck key part 71 is disposed alongside the exterior of handle 60, as will be understood from the consideration of FIGS. 6 and 7 in relation to FIG. 1. Further, holder 100 may be oriented angularly on handle 60 to position chuck key 65 to accommodate either right or left-handed users.

From the above description, it is believed that the construction and advantages of the invention will be readily apparent to those skilled in the art. Various changes in detail may be made without departing from the spirit or losing the advantages of the invention.

Having thus described the invention, what is claimed as new and desired to secure by Letters Patent is:

1. A one-piece integral chuck key holder for removably attaching a chuck key having an elongated handle part to a power tool having a handle, said chuck key holder comprising an elastic sleeve for mounting snugly on the free end of the power tool handle, an elastic end wall, and means having an aperture therein, said means being on said sleeve and integral therewith, said aperture being adapted to receive the handle part of the chuck key and being sized for frictionally retaining same in a stored position while permitting ready removal of the chuck key for use.

2. A one-piece chuck key holder for removably attaching a chuck key having an elongated handle part to a pneumatic tool having a hollow handle, the hollow handle being adapted to have coupled thereto a pneumatic hose and being further adapted to exhaust air through the hollow handle, said chuck key holder comprising an elastic sleeve for mounting snugly on the free end of the pneumatic tool handle, an elastic end wall, including means integral therewith having an aperture therein, said aperture being adapted to receive the handle part of the chuck key and being sized for frictionally retaining same in a stored position in the hollow handle of the pneumatic tool while permitting ready removal of the chuck key for use.

3. The one-piece chuck key holder of claim 2, and further comprising a second aperture in said end wall for receiving the pneumatic input hose and a third aperture in said end wall for defining a passage for exhausting air from the pneumatic tool.

* * * * *